United States Patent [19]

Nishi et al.

[11] Patent Number: 5,555,240
[45] Date of Patent: Sep. 10, 1996

[54] PROCESS FOR FABRICATING A LIQUID CRYSTAL DISPLAY WITH SWITCHING ELEMENTS FORMED IN A SUBSTRATE

[75] Inventors: Takeshi Nishi; Toshimitsu Konuma; Michio Shimizu, all of Kanagawa, Japan

[73] Assignee: Semiconductor Energy Laboratory Co., Ltd., Japan

[21] Appl. No.: 246,161

[22] Filed: May 19, 1994

[30] Foreign Application Priority Data

May 21, 1993 [JP] Japan ................................. 5-142883

[51] Int. Cl.⁶ ........................ G02F 1/1333; G02F 1/136
[52] U.S. Cl. ........................................... 359/82; 359/58
[58] Field of Search ................................ 359/82, 59, 58

[56] References Cited

U.S. PATENT DOCUMENTS 4,674,840  6/1987  Bennett .................................... 350/337
5,317,432  5/1994  Ino .......................................... 359/59

FOREIGN PATENT DOCUMENTS 58-186720  10/1983  Japan ...................................... 359/82
63-18327   1/1988   Japan ...................................... 359/82
4-18525    1/1992   Japan ...................................... 359/82
4-133029   5/1992   Japan ...................................... 359/59

Primary Examiner—William L. Sikes
Assistant Examiner—Charles Miller
Attorney, Agent, or Firm—Sixbey, Friedman, Leedom & Ferguson; Gerald J. Ferguson, Jr.; Karlton C. Butts

[57] ABSTRACT

A liquid crystal electro-optical device improved in contrast ratio by reducing alignment defects of the liquid crystal molecules. The electro-optical device comprises a pair of substrate having a liquid crystal material incorporated therebetween, provided that one of the pair of the substrates having a switching element thereon is thermoplastic. The process for fabricating the liquid crystal electro-optical device comprises subjecting said thermoplastic substrate having thereon the switching element to pressing to accommodate the switching elements in the concave portions of the substrate.

9 Claims, 1 Drawing Sheet

PROCESS FOR FABRICATING A LIQUID CRYSTAL DISPLAY WITH SWITCHING ELEMENTS FORMED IN A SUBSTRATE

BACKGROUND OF the INVENTION

1. Field of the Invention

The present invention relates to an active matrix type liquid crystal electro-optical device comprising a switching element such as a thin film transistor (TFT), and a process for fabricating the same.

2. Prior Art

Liquid crystal electro-optical devices are attracting much attention as display devices these days. In particular, active-matrix addressed display devices comprising pixels each driven individually by a switching element are known to have excellent contrast ratio and speed.

Concerning the advantages above, active matrix display devices are certainly superior to other devices. However, alignment defects tend to generate in the liquid crystal material due to the irregularities which form by the presence of the active elements such as the TFTs. Particularly, the alignment defects are found to form more frequently on ferroelectric liquid crystal devices because the active elements more severely disturb the ferroelectric liquid crystal materials. Those defects result in devices having an impaired contrast ratio.

SUMMARY OF THE INVENTION

An object of the present invention is, accordingly, to provide a liquid crystal electro-optical device equipped with switching elements, characterized in that it yields an improved contrast ratio by using a liquid crystal material reduced in alignment defects.

Accordingly, the present invention provides a process which comprises forming a switching element on a thermoplastic substrate, and pressing the surface of said substrate having thereon the switching element by applying a pressure to said substrate while heating said substrate to a temperature not lower than the glass transition temperature of the substrate. During the heating of said substrate to a temperature not lower than the glass transition temperature, the substrate exhibits plasticity.

DETAILED DESCRIPTION OF THE INVENTION

Figure 1:
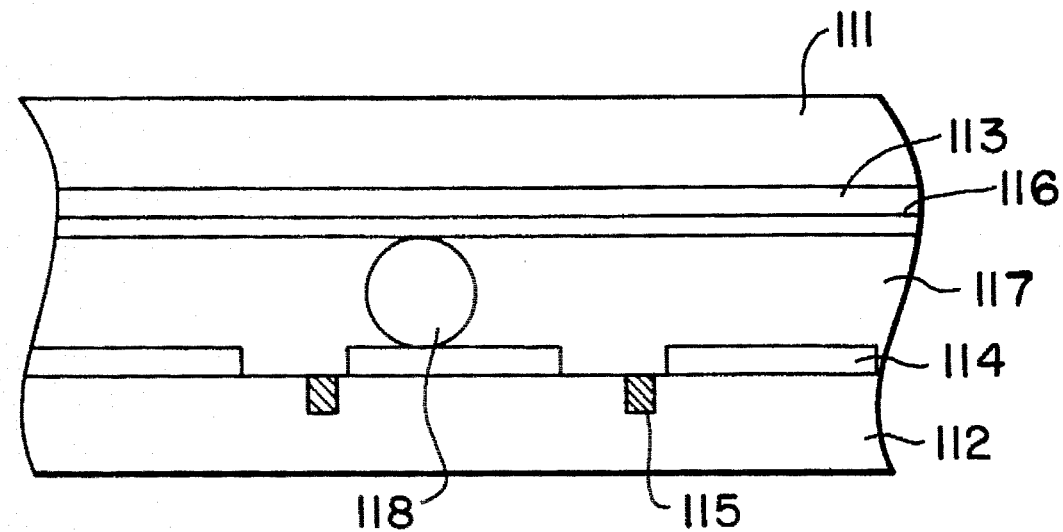
FIG. 1 is a schematically shown liquid crystal cell according to a first embodiment of the present invention.

As mentioned in the foregoing, the present invention provides an electro-optical device fabricated by mounting switching elements on a thermoplastic substrate and pressing them against the substrate. In this manner, the surface irregularities attributed to the presence of TFT (thin film transistor) elements and the like on the substrate can be substantially removed to prevent the generation of alignment defects such as zigzag defects. In particular, a liquid crystal electro-optical modulating layer having favorable liquid crystal molecular alignment (orientation) can be provided on the substrate by arranging the liquid crystal molecules in a uniform alignment (orientation) (in such a manner that the liquid crystal molecules are aligned (oriented) along one direction between the substrates) more suitable for realizing high contrast ratio instead of a twisted alignment (orientation) (in such a manner that the liquid crystal molecules are arranged in a twisted alignment (orientation)). In this manner, a high contrast ratio can be achieved by employing the uniform alignment.

Furthermore, the process according to the embodiment of the present invention comprises burying TFTs (thin film transistors) by forming the TFTs in the concave portions of the substrate; i.e., by fabricating the TFT elements on a flat substrate, and then pressing the TFT elements against the substrate. A flat surface constituted by the substrate and the buried TFT (as a switching element) is then formed. The process may further comprise the step of forming a pixel electrode on this flat surface. It can be seen that the process is more simple and productive than a conventional process composed of complicated steps.

The present invention is illustrated in greater detail referring to a non-limiting example below with the attached figure. It should be understood, however, that the present invention is not to be construed as being limited thereto.

EXAMPLE

Referring to FIG. 1, the constitution of a liquid crystal electro-optical device fabricated by a process according to the present invention is described below. A light-transmitting thermoplastic substrate 112, a polyethylene terephthalate substrate in this case, is used as one of the substrates constituting the cell. An active matrix comprising a pixel electrode 114 and an amorphous silicon TFT (thin film transistor) 115 is formed on said substrate. The TFT 115 is formed inside the concave portion of the substrate. A blue sheet glass (a soda-lime glass) is used as the other substrate 111, and an ITO film 113 is formed over the entire surface thereof. An orientation film 116, to which uniaxial orientation treatment is applied, is provided on the ITO film 113 by coating. A liquid crystal material 117 is incorporated between the two substrates.

The process for fabricating the device more specifically comprises fabricating first a TFT element on the substrate 112, and enchasing the TFT element into the substrate by pressing the TFT element against the substrate while heating the substrate to a temperature not lower than the glass transition temperature thereof, for example, to a temperature of 150° C. in the present example. A TFT element enchased inside a substrate is thus obtained by cooling the entire structure which results after pressing. Substrates having no surface irregularities can be obtained in this manner.

Subsequently, an ITO film is formed as a display pixel on the flat surface. Display pixels each 20 μm×60 μm in size are arranged to give a 1920×480 matrix.

An orientation film 116 is formed thereafter using a polyimide resin, such as LQ-5200 (a product of Hitachi Chemical Co., Ltd.), LP-64 (a product of Toray Industries, Inc.), and RN-305 (a product of Nissan Chemical Industries, Ltd.). In this example, LP-64 is diluted with a solvent such as n-methyl-2-pyrrolidone, and applied to the surface of the ITO film by spin coating. The orientation film is formed on only one of the substrates having no switching element formed thereon to realize liquid crystal arranged in uniform alignment. The substrate coated with the polyimide resin is heated for 2.5 hours in the temperature range of from 250° to 300° C., specifically, at 280° C. in this case. The solvent is then dried and the coating film imidized to obtain a thermally set film 300 Å in thickness.

The orientation film thus obtained is then subjected to rubbing treatment. This treatment is effected by applying a roller comprising a rolled cloth such as of Rayon or cotton along one direction at a rotation speed of 450 to 900 rpm, e.g. 450 rpm.

As spacers 118, spheres (product of Catalysts & Chemicals Industries Co., Ltd.) each 1.5 μm in diameter are scattered on one of the substrates having thereon the orientation film coating. Then, as a sealant for fixing the two substrates, a two-liquid epoxy based adhesive is applied to the periphery of the other substrate by screen printing. The two substrates thus obtained are adhered and fixed.

A liquid crystal material 117 is injected between the thus obtained pair of substrates. A ferroelectric liquid crystal having an Iso-SmA (Isomorphic-Smectic A) transformation temperature of 71.7° C. is used in this example. The injection is effected under vacuum while maintaining the liquid crystal cell and the liquid crystal material at 70° C. The liquid crystal cell thus obtained is gradually cooled thereafter at a rate of from 2° to 20° C./hour, specifically in this example, at a rate of 3° C./hour.

The alignment of the liquid crystal in the cell was observed using a polarization microscope under crossed nicols. An extinction position was obtained at a certain angle of rotation; i.e., a light incident to one of the polarizer sheets was not transmitted by the other polarizer sheet. This signifies that the liquid crystal cell is implemented in a configuration of cutting off the light. This phenomena is attributed to the liquid crystal molecules being arranged in a uniform alignment, because no orientation film is provided on the substrate having TFT elements thereon.

Furthermore, this substrate having the TFT elements thereon but not the orientation film exhibits a flat and smooth surface. Accordingly, an extremely favorable uniform alignment can be realized with no defective portions having, for example, zigzag defects.

The liquid crystal cell implemented in this manner was found to have a contrast ratio of 100 upon measuring the optical properties thereof.

As described in detail in the foregoing, the present invention provides an active-matrix addressed liquid crystal electro-optical device free of alignment defects such as zigzag defects.

The process according to the present invention prevents alignment defects ,attributed to the presence of active elements from occurring, and imparts uniform alignment to the liquid crystal molecules. Thus, the process according to the present invention provides liquid crystal electro-optical devices having a high contrast ratio.

The process according to the present invention is far simpler than a prior art process which comprises providing concave portions for each of the elements on the substrate and forming TFTs therein. It can be seen therefore that the process according to the present is highly productive.

Conclusively, the present invention provides a liquid crystal electro-optical device having a considerably improved contrast ratio by preventing alignment defects from occurring.

The present invention is particularly effective for liquid crystal electro-optical devices using ferroelectric liquid crystals, however, it is also useful for those using other types of liquid crystals.

While the invention has been described in detail and with reference to specific embodiments thereof, it will be apparent to one skilled in the art that various changes and modifications can be made therein without departing from the spirit and scope thereof.

What is claimed is:

1. A process for fabricating an electro-optical device comprising:

forming a switching element on a surface of a thermoplastic substrate; and subjecting the surface of the substrate having thereon the switching element to pressing by applying pressure to the switching element while heating the substrate to a temperature not lower than a glass transition temperature of the substrate.

2. The process of claim 1 wherein the switching element comprises a transistor.

3. The process of claim 1 wherein the substrate comprises polyethylene terephthalate.

4. The process of claim 1 wherein the electro-optical device is a liquid crystal electro-optical device.

5. The process of claim 1 wherein the substrate exhibits plasticity during the heating.

6. A process for fabricating an electro-optical device comprising:

forming a switching element on a surface of a thermoplastic substrate; and subjecting the surface of the substrate having thereon the switching element to pressing by applying pressure to the switching element while heating the substrate to a temperature not lower than a glass transition temperature of the substrate, wherein the switching element is recessed in the substrate by pressing and heating.

7. The process of claim 5 further comprising the step of cooling the substrate with the switching element being recessed in the substrate.

8. A process for fabricating an electro-optical device comprising:

forming a switching element on a surface of a thermoplastic substrate; and subjecting the surface of the substrate having thereon the switching element to pressing by applying pressure to the switching element while heating the substrate to a temperature not lower than a glass transition temperature of the substrate, wherein the switching element is recessed in the substrate by pressing and heating and a fiat surface constituted by the substrate and the switching element is formed by the pressing and heating step.

9. The process of claim 8 further comprising the step of forming a pixel electrode on the flat surface.

\* \* \* \* \*